Patented Aug. 17, 1948

2,447,055

UNITED STATES PATENT OFFICE 2,447,055

PRODUCTION OF EXPANDED PLASTIC MATERIALS

Alfred Cooper, Croydon, England, assignor to Expanded Rubber Company Limited, Croydon, England No Drawing. Application October 10, 1944, Serial No. 558,076. In Great Britain October 7, 1943

1 Claim. (Cl. 260—83)

This invention relates to the production of expanded plastics of the polyvinyl or ethenoid types produced from liquid monomers or low polymers by polymerisation to produce hard thermo-plastic materials.

The production of low density cellular materials from these thermo-plastic materials has, in many cases, been attended with difficulties owing to the fact that the softened polymer does not readily absorb gases.

It has now been found that if the liquid monomer or material in the early stages of polymerisation is heated at a moderate temperature (e. g. 60°–70° C.) until the material polymerises to a rubbery consistency, this rubbery material can be treated as in the established practice of expanded rubber production and sheeted out on a rubber mill, and subjected to gas pressure of the order of 5,000 lbs. per square inch, either at room temperature or elevated temperatures such as 100° to 110° C.

According to the present invention a process for the production of expanded polymerisable materials comprises heating the said material in the monomeric or early polymerised state, (i. e. while still liquid at room temperature) until a rubbery material is produced and treating the plastic dough thus obtained in known manner by milling and sheeting and gas impregnation to produce a cellular material, and finally continuing the heating until the material is strong enough to retain its cellular structure.

In this way cellular polystyrene, polymethyl methacrylate and other polymers from unsaturated bodies including the polyethylene type plastics may be produced, and the invention is applicable to any material which can be polymerised to a rubbery consistency and will in this state absorb gases.

Thus in the production of cellular polystyrene: The monomeric styrene which is a clear liquid can readily be poured into suitable vessels. These are subjected to heat of approximately 60°–70° C. for a period until the monomer has partly polymerised and has assumed a stage between the monomer and the polymer. At this stage it is quite rubbery, and can be sheeted out on a rubber mill. This sheet can be subjected to gas pressure in the order of 5,000 lbs. per square inch either at room temperature or at elevated temperatures such as 100°–110° C. during which it absorbs gas. On extracting the material from the high pressure autoclaves it is transferred into suitable moulds in which, by means of further heating, the material expands to its final shape taking the contour of the mould. It is possible by this method to produce light density materials in the region of 10 lbs. per cubic foot. Similarly, mixing monomeric styrene and monomeric methyl methacrylate gives the possibility of producing a co-polymer, which also readily responds to the gassing treatment. It is understood that the process is not confined to the two plastics mentioned above but finds application in a variety of products.

The process outlined above deals with a gassing method for expansion, but it is also possible to commence with the monomer and rely on chemical blowing agents. By this method a small percentage of blowing agent such as sodium carbonate, ammonium carbonate or diazoamino-benzene, is mixed in thoroughly, and the monomer is subjected to heat at 60°–70° C. until it thickens sufficiently to be put on a rubber mixing mill where it is homogenised and sheeted out ready for placing in a mould for heating in the press where the expansion takes place.

A further alternative procedure is possible by mixing the semi-polymerised monomer with the blowing agent on the mill.

The time of semi-polymerisation may be lengthened or shortened, also the temperature may be decreased or increased as desired or as found necessary by using an inhibitor or an accelerator, whichever is required. A number of inhibitors or accelerators are in use in the plastics industry. Of the former hydroquinone may be mentioned as a suitable material and in the case of the latter benzol peroxide may be used. By using such substances complete control of the semi-polymerising process may be exercised.

Filling materials and colouring materials and plasticizers may be incorporated either with the monomer or partially polymerised material, in accordance with known practice.

What I claim is:

The process of making expanded bodies having closed cells of a thermoplastic polymer selected from the class consisting of polystyrene, polymethyl methacrylate and copolymers of these two, which comprises heating the monomers to 60–70° C. for a period sufficient to just obtain partial polymerization to a plastic dough of rubbery consistency which can be sheeted out on a rubber mill, manipulating the plastic dough which is obtained to obtain it in sheet form, subjecting the sheet to gas under pressure approximating 5000 pounds per square inch at from room temperature to 100° C. to obtain gas impregnation, and thereafter locating the gas impregnated sheet in a mold and heating it to expand the contained gas and complete the polymerization of the polymer to a strength to retain its cellular structure.

ALFRED COOPER.

REFERENCES CITED

The following references are of record in the file of this patent:

UNITED STATES PATENTS

| Number | Name | Date |
|---|---|---|
| 2,132,969 | Rau | Oct. 11, 1938 |
| 2,183,857 | Turkington | Dec. 19, 1938 |
| 2,283,316 | Cooper | May 19, 1942 |
| 2,371,868 | Berg | Mar. 20, 1945 |
| 2,376,653 | Boyer | May 22, 1945 |
| 2,386,995 | Wigal | Oct. 16, 1945 |

FOREIGN PATENTS

| Number | Country | Date |
|---|---|---|
| 500,298 | Great Britain | Feb. 7, 1939 |
| 502,759 | Great Britain | Mar. 24, 1939 |